United States Patent Office 2,824,848
Patented Feb. 25, 1958

2,824,848

POLYAMIDE RESIN SUSPENSOIDS

Harold Wittcoff, Minneapolis, Minn., assignor to General Mills, Inc., a corporation of Delaware No Drawing. Application August 8, 1956
Serial No. 602,916

8 Claims. (Cl. 260—29.2)

The present invention relates to suspensoids of certain mixtures of polyamide resins and is a continuation-in-part of co-pending application Serial Number 282,699, filed April 16, 1952. These suspensoids possess unusual properties which will be pointed out more fully hereinafter.

Heretofore heat-seal compositions which seal to plastic films have not been generally available. In order to obtain a heat-seal composition which seals, for example, to a vinyl plastic film, or to a polyvinylidene chloride containing film it has been necessary to add plasticizers to the heat-seal composition. As a matter of fact, it has been necessary to add these plasticizers to such an extent that the film from the heat-seal composition becomes tacky and blocks under normal storage conditions. Thus such compositions are virtually useless as heat-seal products. This follows since heat-seal compositions are usually coated on paper, the coated paper being then stored either in huge rolls or as stacked sheets. In either case tremendous pressures are developed on the heat-seal surfaces. In addition, during the summer time or in the warm climates the temperature of the storage room may be as high as 50–60° C. and the humidity may approach 100%. A good heat-seal composition must not block under such severe conditions, and at the same time should be capable of being activated for sealing at temperatures as low as 70° C. and continue to seal at temperatures as high as 200° C.

As previously indicated, when heat-seal compositions are highly plasticized in order to make them seal to films such as vinyl films, they become tacky and do not meet the severe blocking requirements outlined above. The suspensoids of the present invention, however, are readily coated on a wide variety of surfaces to provide fast drying films which are not tacky, as will be shown more fully hereinafter, even under conditions where many other heat-seal compositions block. In addition to being non-blocking, the suspensoids of the present invention permit heat-seals over wide temperature ranges, starting at 70° C. Of greatest importance, however, is the fact that in combination with these excellent properties of elongated heat-sealing range and lack of blocking, the suspensoids seal to a wide variety of surfaces, including vinyl plastic films, polyvinylidene chloride-containing films, cellulose acetate films, rubber hydrochloride films, metal and glass. Of particular merit is the fact that the compositions embodied in the present invention provide seals for uncoated cellophane, i. e., the type of cellophane frequently referred to as P. T. or plain transparent cellophane. There are many heat-seal materials which provide seals for coated cellophane particularly when the cellophane is coated with nitrocellulose compositions. There are very few, if any, heat-seal compositions, however, which can be used to bond uncoated cellophane. In addition to providing seals for the aforementioned substances, the suspensoids also provide bonds for cloth, asbestos, metal foils of all sorts, rubber lacquered and enameled surfaces, floc, and in general, for a wide variety of surfaces to which it is ordinarily difficult to make heat-activated bonds.

It is therefore an object of the present invention to provide novel polyamide resin suspensoids which have the variety of properties described above.

The polyamide resin suspensoids of the present invention are composed of two polyamide resin components: the first is a high melting polyamide resin derived from a mixture of polymeric fat acids and an additional polycarboxylic acid, the latter having at least two carboxyl groups which are separated by at least 3 and not more than 8 carbon atoms. Typical of such polybasic acids are the aliphatic acids, glutaric, adipic, pimelic, suberic, azelaic, and sebacic, and the aromatic acids, terephthalic, and isophthalic acids. The melting point of the copolymer resin may vary within the range of 130–210° C., depending upon the particular reactants, relative ratios thereof, as well as reaction conditions. Desirable copolymers from adipic acid melt at 200–205° C.; from sebacic acid at 180–185° C.; and from terephthalic acid at 165–170° C. In general these polyamide resins are prepared from a mixture of polycarboxylic acids containing from 85–98% by weight of fatty polymeric acids and from 2–15% by weight of the additional polycarboxylic acid. The polyamides may be made by the condensation of this mixture of polybasic acids with an aliphatic polyamine such as ethylene diamine in accordance with the teachings of Cowan et al. Patent 2,450,940.

The second component of the mixture of polyamides is a polyamide derived from polymeric fat acids and polyamines having at least 3 atoms intervening between the amino groups principally involved in the amidification reaction. These atoms may be either carbon atoms or hetero atoms. These polyamides melt below 100° C. and generally melt within the range of 25–75° C. They are all tacky materials possessing a high degree of cold flow.

The "polymeric fat acids" employed in preparing the polyamide resins are those resulting from the polymerization of drying or semi-drying oils, or their free acids or the simple aliphatic alcohol ester of these acids, i. e., sources rich in linoleic acid. Suitable drying or semi-drying oils include soybean, linseed, tung, perilla, cottonseed, corn, sun flower, safflower and dehydrated castor. Suitable fatty acids may also be obtained from tall oil, soapstock, and other similar material. In the polymerization process for the preparation of the polymeric fat acids the fatty acids with sufficient double bond functionality combine for the most part, probably by a Diels-Alder mechanism, to provide a mixture of dibasic and higher polymeric fat acids. These acids are often referred to as dimers, trimers, etc. In place of this method of polymerization, any other method of polymerization may be employed whether the resultant polymer possesses residual unsaturation or not. Thus, the term "polymeric fat acids" as used herein is intended to include the polymerized mixture of acids, which usually contain a predominant portion of dimer acids, a small quantity of trimer and higher polymeric fat acids and some residual monomer.

It has been postulated that the structural formula of the dimer acid from linoleic acid is as follows:

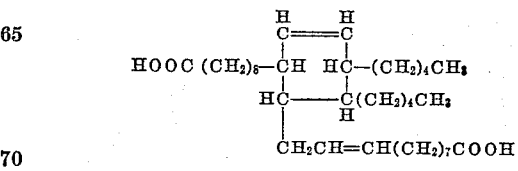

The trimer is then formed from the dimer by a Diels-Alder reaction with linoleic or linolenic acid at either of the double bonds shown in the above formula. It will be appreciated that the polymeric fat acids will, as a practical matter, result from fatty acid mixtures that contain a preponderance of linoleic acid since the only naturally occurring poly-unsaturated acid available in large quantities is linoleic acid. It should also be appreciated that since linoleic acid occurs in nature as a complex mixture in every instance, it is available in various degrees of purity ranging from relatively expensive pure linoleic acid that has been laboriously purified to crude sources such as tall oil and soap-stock which contain substances other than fatty acids. In actual practice linoleic acid rich mixtures of fatty acids are used to prepare the polymeric fat acids. One method of obtaining the linoleic acid rich fatty acids is by separating a major portion of the oleic and saturated fatty acids from any convenient and economical source of fatty acids having a high iodine value. In addition, polymeric fat acids are readily available commercial products. One such product is "Empol 1022" as sold by Emery Industries, Inc.

Typical of the polyamines which may be used are diethylene triamine, triethylene tetramine, tetramethylene pentamine, 1,4-diaminobutane, 1,3-diaminobutane, hexamethylene diamine, diacetone diamine, 3-(N-isopropyl-amino)propylamine, 3,3'-imino-bispropylamine and the like.

For the suspensoids of the present invention the low melting polyamide resin must be present at least to the extent of 10% of the composition. Furthermore, when a small quantity of the low melting resin is employed, it is preferred that the melting point of the higher melting copolymer resin be not in excess of 160° C. On the other hand, the low melting resin should not be present to an extent greater than 80% of the composition to avoid tacky films which would not be acceptable as heat-seal adhesives. Furthermore, if 80% of the composition is the low melting resin, it is desirable to employ as the high melting copolymer a resin which melts in the upper portion of the range 130–210° C. It will be appreciated that the higher the melting point of the copolymer resin, the more brittle it is and the more tendency it will have to detackify the lower melting resin. Similarly, the lower the melting point of the lower melting resin, the more tendency it will have to tackify the higher melting resin, and accordingly a balance must be maintained both between the melting points of the resins and the relative quantities of each employed. In general it is preferred to employ from 40–60% of the low melting tacky resin and between 60% and 40% of the higher melting copolymer resins.

In the preparation of the polyamide resins described above it is important that the final compositions have free amine groups and the relative number of these free amine groups is referred to as the "amine number." As used herein, the amine number may be defined as the milligrams of potassium hydroxide equivalent to the free amine groups in one gram of product. The polyamide resins employed in the present invention must have an amine number of at least 5, and preferably should have an amine number of at least 10. The amine numbers of th polyamides may be as high as 100 or more. This is especially true when the resins are prepared with amines such as diethylene triamine, which contains a secondary amine group which presumably does not enter into the reaction.

In resins prepared from ethylene diamine the amine number is readily controllable, and for practical purposes need not exceed 15. Actually a higher amine number is not detrimental in the present invention but it is of no advantage. This applies also to the low melting polyamide resins which are prepared with amines such as diaminobutane. When amines such as diethylene triamine are used where as previously indicated the secondary amine groups do not enter into the reaction, a very high amine number is preferred.

The preparation of suspensoids from these mixed polyamides involves simply the melting of the polyamide mixture, followed by the addition of water containing a small amount of acid. The entire mixture is agitated vigorously. If the melting point of the mixture of polyamide resins is above 100° C., as is frequently the case, it is desirable to prepare the suspensoid under pressure such that the aqueous phase may be above 100° C.

A wide variety of acids may be employed to effect this dispersion. Suitable acids include formic, acetic, propionic, butyric, monochloracetic, hydrochloric, phosphoric, boric, fumaric, lactic, maleic, oxalic, tartaric, glycollic, benzoic, succinic, terephthalic, gallic, and the like. Only a small quantity of acid is necessary to effect dispersion. The quantity of acid may be only a small portion of that which would be required to neutralize the free amine groups in the polymer or in the polymer mixture in those cases where the total amine number is greater than 20. In the case of polymers or polymer mixtures having amine numbers below 20, the quantity of acid employed should be that which would neutralize a substantial portion of the amine groups. Where the polymers or polymer mixtures have amine numbers below 10, the quantity of acid employed should be about enough to completely neutralize the amine groups. In general, it may be stated that sufficient acid should be employed to neutralize a quantity of amine groups in the polymer mixture equivalent to an amine number of from 7 to 20. The optimum quantity of acid for any particular polyamide resin mixture and for each specific acid used can be readily determined.

When larger quantities of acid than those described as being preferred are employed with mixtures containing high amine numbers, colloidal solutions or gels may be formed. This is particularly true where the amine number of the mixture is above 20. These colloidal solutions or gels are useful in various applications, but in general are less desirable than the suspensoids described above. This phenomenon, however, may be made use of in controlling the viscosity of the suspensoid, particularly in the case where the mixtures have high amine numbers.

The solids concentrations of these suspensoids can be varied widely in the range of 35–60%. Higher or lower concentrations are, of course, possible and extreme dilutions can be made without destroying the inherent stability of the compositions. The particle size in the suspensoids is of the order of 1 micron.

As alternative method of forming the suspensoids the following are possible. The individual polyamides may be separately dispersed in aqueous acid to form separate suspensoids and these suspensoids may then be mixed together. Furthermore, in place of employing a mixture of polyamides, each of which has an amine number, a mixture of polyamides may be employed in which only one of the polyamides has any appreciable amine number, this polyamide being the means whereby the other polyamide which has substantially no amine number is dispersed in water.

Since the suspensoids of the present invention are cationic, they are compatible with a wide variety of cationic or non-Ionic dispersions which may be used to modify the properties of the present suspensoids. Dispersions with which these suspensoids are compatible include a wide variety of elastomeric substances, particularly natural and synthetic rubber latices of all sorts, such as natural rubber latex, polyisobutylene latex, butadiene latex, butadiene-styrene copolymer latex, isoprene latex, chloroisoprene latex, acrylonitrile-butadiene copolymer latex. Compatible dispersions also include resin emulsions or suspensoids such as those derived from polyvinyl acetate, polyvinyl butyral, polyfluorethylene, terpene resins, acrylic resins such as polyacrylonitrile, polymethyl methacrylate and the like, halogen-containing resins such as polyvinyl chloride, phenolic resins such as phenol-formaldehyde resins, vegetable and mineral oils, asphalt, and the like.

Of particular importance is the compatibility of these polyamide resin suspensoids with polyvinyl acetate emulsions. The suspensoids serve to improve the water resistance of the polyvinyl acetate emulsions. They also serve to plasticize the emulsions and to decrease the tack of the emulsions. For this reason, blends of polyamide resin suspensoids and polyvinyl acetate emulsions are particularly desirable.

In addition to being compatible with a wide variety of dispersions described above, the present polyamide resin suspensoids may be used as a means of dispersing other materials which are non-dispersible by themselves. Thus non-dispersible materials may be included in the mixture of resins and these may be dispersed along with the polyamide resins themselves. Included among these non-dispersible materials are plasticizers such as a great variety of sulfonamides, for example N-ethyltoluenesulfonamide; phosphates, such as tributyl phosphate, tricresyl phosphate, triethyl phosphate; and other plasticizers, such as dibutyl phthalate, dioctyl phthalate, dicapryl phthalate, dibenzyl sebacate, 2-ethylhexanediol-1,3; a great variety of rosin derivatives; a great variety of alkyd resins such as glycerol-castor oil acids-sebacic acid, alkyd, dioctyl sebacate, tall oil, chlorinated hydrocarbons, phenolic resins, coumarone indene resins, and a great variety of commercial plasticizers of which the hydrocarbon and terpene types are important.

Tackifiers may also be dispersed along with the polyamide resins. Suitable tackifiers include rosin, disproportionated rosin, hydrogenated rosin, polymerized rosin, rosin from tall oil; the glycol, glycerol, pentaerythritol, 2,2,6,6-tetramethylol-cyclohexanol and other polyhydric alcohol esters of these rosins; maleic modified rosins, rosin esters, methyl and other alkyl esters of rosin, limed rosin, rosin alcohols and their esters, phenolic resins, tri-(p-tert-butylphenyl)phosphate, coumarone-indene resins, chlorinated naphthalene, furfuryl alcohol, blown castor oil, and the like.

In addition to the variety of the materials listed above a great variety of water-soluble or water-dispersible substances may be incorporated in the suspensoids. These materials include all types of polyvinyl alcohols; polyvinyl alkyl ethers such as polyvinyl methyl ether; polyalkylene glycols such as polyethylene glycol, and their esters and ethers; cellulose derivatives such as methyl cellulose, ethyl cellulose, hydroxy ethyl cellulose and carboxy methyl cellulose; starch derivatives such as carboxy methyl starch, modified starch, dextrin; and various gums such as karaya, locust bean and tragacanth gums, Irish moss, and the like. These materials may be added directly to the suspensoid after it has been formed or else may be incorporated into the water used in the formation of the suspensoid. The latter procedure is preferable when large quantities of the additives are to be used, whereas the former procedure works well for smaller quantities. These materials for the most part serve not only to increase the viscosity of the suspensoid but also to provide a firmer adhesion of the suspensoid film to a surface thus preventing cracking or "dusting."

This invention can be illustrated further by reference to the following examples in which all "parts" are expressed as parts by weight.

HIGH MELTING COPOLYMER RESINS

Example 1

(a) For this preparation polymeric fat acids derived from a linoleic acid rich fatty acid mixture by polymerization at about 325° C. were used having the following properties:

| | |
|---|---|
| Percent monomer | 10.0 |
| Percent dimer | 69.5 |
| Percent trimer | 20.5 |
| Saponification equivalent | 291.1 |

A mixture of these polymeric fat acids (437 parts) oleic acid (17.5 parts) and sebacic acid (48.4 parts) were heated to 130° C. after which 94.2 parts of 67.5% ethylene diamine were added at a rate such that the temperature of the vapor escaping from the reaction did not exceed 99° C. The reaction vessel was fitted with a fractionating column so that the water vapor would be removed whereas the ethylene diamine remained in the reaction vessel. After all the ethylene diamine had been added, the pot temperature was maintained at 200° C. for 3 hours. During the last hour of reaction the apparatus was maintained under vacuum. The product was then poured over Dry Ice and allowed to solidify. It had the following properties:

| | |
|---|---|
| Melting point (ball and ring) ° C | 183 |
| Gel time at 200° C minutes | 14 |
| Color (Gardner) | 11 |
| Penetration hardness | 2.5 |
| Amine number | 16.0 |
| Acid number | 6.3 |

(b) A second high melting copolymer was prepared according to the procedure of 1(a) using the following ingredients:

| | Parts |
|---|---|
| Polymeric fat acids (composition indicated in Example 1(a)) | 40.0 |
| Oleic acids | 17.5 |
| Sebacic acids | 32 |
| Ethylene diamine (75.6%) | 56.8 |

The product had the following properties:

| | |
|---|---|
| Melting point (ball and ring) ° C | 176.5 |
| Gel time at 200° C | Greater in 40 min. |
| Acid number | 8.5 |
| Amine number | 15.8 |
| Color (Gardner) | 11 |
| Penetration hardness | 2.3 |
| Viscosity at 25° C. (Gardner-Holdt) | A-B |

The viscosity of these materials was determined in a 25% solution of phenol-butanol (1:1). The color was determined in a 35% solution in toluene-butanol (1:1).

(c) Another typical copolymer resin which may be used in the invention was prepared in the manner described in Example 1(a) from the following ingredients:

| | Parts |
|---|---|
| Polymeric fat acids (composition indicated in Example 1(a)) | 40.0 |
| Oleic acid | 29.2 |
| Adipic acid | 11.7 |
| Ethylene diamine (75.6%) | 52 |

The product had the following properties:

| | |
|---|---|
| Melting point (ball and ring) ° C | 176.5 |
| Acid number | 8.0 |
| Amine number | 14.6 |
| Color (Gardner) | 11–12 |
| Penetration hardness | 4.4 |
| Gel time minutes | 30 |
| Viscosity (Gardner-Holdt) | A–1 |

LOW MELTING POLYAMIDE RESINS

Example 2

The materials employed were as follows:

| | Parts |
|---|---|
| Polymeric fat acids (composition indicated in Example 1(a)) | 40.0 |
| Oleic acid | 2.4 |
| Diethylene triamine (95.6%) | 7.48 |

The materials were placed in the same type of apparatus described in Example 1(a) and were heated slowly to a temperature of 200° C. with vigorous agitation. The heating was controlled so that the temperature of the escaping vapor did not exceed 100° C. The reaction mixture was maintained at 200° C. for 3 hours and during the last hour vacuum was employed. At the end of the reaction period the vacuum was released and the product was cooled. The product had the following properties:

Melting point (ball and ring) ° C__ 46.5
Color (Gardner) _____ 10–11
Viscosity at 25° C. (Gardner-Holdt)_ B–C
Acid number_____ 5.2
Amine number_____ 86
Gel time at 200° C_____ Greater than 30 min.

*Example 3*

Seven hundred parts of the copolymer resin described in Example 1(b) were melted and to the molten mixture were added 300 parts of the soft polyamide resin described in Example 2. The mixture was heated to 190° C. after which 1500 parts of hot water containing 10 parts of glacial acetic acid were added with vigorous stirring. The stirring was continued for 15 minutes during which time the heat was removed and the dispersion was allowed to cool. There resulted a white, smooth, creamy dispersion of medium viscosity and a solids content of 40%.

*Example 4*

Six hundred parts of the copolymer resin described in Example 1(b) were melted and to the molten mixture were added 400 parts of the soft polyamide resin described in Example 2. The mixture was heated to 190° C. after which 1500 parts of water containing 9 parts of glacial acetic acid were added with vigorous agitation. The source of heat was removed and the agitation was allowed to continue for 15 minutes. A smooth, creamy dispersion with a solids content of 40% resulted.

*Example 5*

The procedure described in Example 4 was repeated using 500 parts of the copolymer resin, 500 parts of the soft resin, 1500 parts of water and 9 parts of glacial acetic acid. Again a smooth dispersion with a solids content of 40% resulted.

*Example 6*

The procedure of Example 4 was repeated using 400 parts of the high melting copolymer resin and 60 parts of the soft resin together with 1500 parts of water and 8.5 parts of glacial acetic acid. There resulted a smooth creamy dispersion with a solids content of 40% and an acid number of 6.3. The pH of the dispersion was 7.66.

*Example 7*

The procedure of Example 4 was repeated using 300 parts of the high melting copolymer resin and 700 parts of the soft resin together with 1500 parts of water and 7.5 parts of glacial acetic acid. Again a smooth creamy dispersion with a solids content of 40% resulted.

*Example 8*

Eight hundred parts of the polyamide resin described in Example 1(b) were melted and to the resin were added 1200 parts of the soft polyamide resin described in Example 2. This mixture was heated to 190° C. and was agitated strongly while 3000 parts of hot water were added. Together with the water were added 18 parts of glacial acetic acid and 200 parts of 50% dodecylamine acetate solution. A smooth creamy dispersion resulted. It is also possible to disperse the material using only the acetic acid and to add the dodecylamine acetate solution with stirring after the initial dispersion is made.

*Example 9*

To 670 parts of the dispersion described in Example 6 were added 97.1 parts of a polyvinyl acetate emulsion of 55% solids content. The resulting mixture was stirred and complete compatibility was demonstrated. The product had a solids content of 42.7%.

*Example 10*

To 1000 parts of the dispersion described in Example 6 were added 250 parts of a 32% cationic water dispersion of a methacrylic resin. The mixture was stirred for 1 hour to obtain a completely compatible material.

*Example 11*

180 parts of the copolymer polyamide resin described in Example 1(b) were melted and to the melt were added 120 parts of the soft polyamide resin described in Example 2. To this melt were added 60 parts of a plasticizing and tackifying material composed essentially of a monoglyceride of a mixture of fatty and rosin acids (30:70). The melt was heated to 190° C. and 555 parts of warm water containing 2.7 parts of glacial acetic acid were added with vigorous stirring. A low viscosity dispersion resulted with a solids content of 39% and an acid number of 5.0.

*Example 12*

A melt of 600 parts of the polyamide resin described in Example 2 and 400 parts of the polyamide resin described in Example 1(b) were heated to 190° C. Thereafter a mixture of 1800 parts of water, 200 parts of low viscosity polyvinyl alcohol and 8.5 parts of glacial acetic acid were added to the molten resin mixture with vigorous stirring. The water solution was heated almost to the boiling point prior to addition. A smooth viscous dispersion resulted. The polyvinyl alcohol may be added to the dispersion of resins after the dispersion has been made if desired.

*Example 13*

A low melting polyamide resin was prepared from 375 parts polymeric fat acids derived from a linoleic acid rich fatty acid mixture by polymerization at about 325° C. containing about 65% dimer (di-linoleic acid), 30 parts oleic acid and 75 parts diethylene triamine according to the procedure outlined in Example 2.

This resin had the following properties:

Properties:
    Melting point (ball and ring)_____°C__ 47.9
    Color (Gardner)_____ 8–9
    Viscosity at 25° C. (Gardner-Holdt)_____ B
    Acid number_____ 7.5
    Amine number_____ 90
    Gel time_____minutes__ 10

*Example 14*

A high melting copolymer resin was prepared as in Example 1 in which 90 parts polymeric fat acids derived from a linoleic acid fatty acid mixture by polymerization at about 300° C., containing about 65% dimer (di-linoleic acid), 3 parts oleic acid, 10 parts sebacic acid and 12 parts ethylene diamine resulted in a resin having the following properties:

Melting point_____°C__ 181
Gel time_____minutes__ 9
Color _____ 11–12
Acid number_____ 3.0
Amine number_____ 11.2
Penetration hardness_____ 1.8

*Example 15*

400 parts of the high melting resin shown in Example 14 were melted and 60 parts of the soft resin shown in Example 13 added to the molten mass. The mixture of the two resins was then heated to 200° C. and 1500 parts of water containing 9 parts glacial acetic acid were added with vigorous agitation. A smooth creamy dispersion containing 41% solids and having an acid number of 6.0 and a pH of 7.77 resulted.

Example 16

1000 parts of the high melting polyamide resin of Example 14 were melted and added to 1000 parts of the softer polyamide prepared as shown in Example 13. The mixture was then heated to 190° C. and agitated vigorously during the addition of 3000 parts water, 18 parts acetic acid and 200 parts of a 50% dodecylamine acetate solution in water. This procedure resulted in a smooth creamy dispersion.

Example 17

Sixty parts of the resin prepared as shown in Example 13 were mixed with 40 parts of the resin shown in Example 14 and the mixture heated to 190° C. 160 parts water, one part acetic acid and 20 parts low viscosity polyvinyl alcohol were added to the molten resin with added heat and vigorous agitation. This resulted in a smooth creamy dispersion.

Example 18

Suspensoids similar to those described in Examples 3, 4, 7, 8, 10, 11 and 12 when prepared from a high melting copolymer resin as shown in 1 (a) and a low melting copolymer resin as shown in Example 13 with equal ease and success and in each case a suitable dispersion resulted.

The blocking resistance of the compositions described in Examples 3, 4, 5, 6 and 7 was tested by the standard TAPPI test T-477-M-477. The suspensoids were coated on label paper at 4 pounds per ream (500 sheets, 20 x 25 inches). The blocking tests were run face to back at 60° C., 100% relative humidity, and 1 pound per square inch for 24 hours. The tests were carried out in desiccators in order to insure an exact and constant humidity. The products gave 0% blocking under these conditions. By way of comparison, a number of standard heat-seal compositions widely used in the trade blocked under similar conditions to the extent of 10-100%.

These compositions were tested for the sealing range. In the determination of the sealing range the object is to discover whether a seal holds at the actual temperature at which it is formed if tension is applied immediately. Ordinarily the heat will melt the composition and a seal will form as the molten material solidifies. For many purposes, however, tension is applied as soon as the resin is softened or melted, and it is necessary that the seal hold at the actual temperature at which it is made. In order to test this property, a testing device was assembled in which a seal was prepared by inserting two 3" strips of label paper between electrically heated jaws. The amount of heat entering the jaws is controlled by a variable transformer and the temperature of the jaws is measured accurately by thermometers inserted into them. The seal is made by stepping on a lever which causes a weight of 8 pounds per square inch to be applied to the seal. The upper strip of the paper which contributes to the seal is held rigid in a vertically upward position. The lower strip is held vertically downward and a 35 gram weight is attached to it. This is set up prior to the time the seal is made so that the 35 gram tension is actually applied to the 3" seal as soon as the jaws are released. For purposes of standardization and to make sure that equilibrium has been established, the jaws are held together for 5 seconds. If the seal holds under the tension applied by the 35 gram weight, sealing is said to have taken place at the temperature under investigation.

The compositions of Examples 5, 6, 8 and 9 were tested under this procedure. All of these materials were coated on label paper at the rate of 4 pounds per ream. The composition of Example 5 demonstrated a sealing range of 70-140° C.; Example 6, 70-120° C.; Example 8, 70-110° C.; Example 9, 70-150° C. By way of comparsion, five heat-seal compositions widely used in the trade were tested. The broadest sealing range demonstrated by any of these five compositions was 80-110° C.

Label paper was coated with the composition described in Example 6 at 4 pounds per ream. The coatings were dried in an oven at 100° C. for a few minutes after which seals were made to cellulose acetate, rubber hydrochloride (Pliofilm), to nitro cellulose coated cellophane, to uncoated (PT) cellophane, and to a film of polyvinylidene chloride polymer (Saran), to glass and to metal. Excellent bonds resulted, and when an attempt was made to remove the labels it was noted that the paper failed, but the bond remained intact. Similar results were obtained with the compositions described in Examples 3, 4, 5, 7 and 8. After one month the seals were examined again and no deterioration whatsoever was observed.

I claim as my invention:

1. A suspensoid in an aqueous medium of (a) from 20-90% of a first polyamide melting within the approximate range of 130-210° C. and being derived from a mixture of from 85-98% polymeric fat acids and from 2-15% of non-fatty polycarboxylic acid in which the carboxyl groups are separated by from 3 to 8 carbon atoms, and an aliphatic diamine and (b) from 10-80% of a second polyamide melting below 100° C. and being derived from polymeric fat acids and an aliphatic polyamine, the amino groups primarily involved in the polyamide formation being separated by at least 3 atoms; the mixture of polyamides having an amine number of at least 5 and being dispersed in an aqueous medium by means of sufficient acid to produce a stable suspensoid.

2. A suspensoid in an aqueous medium of (a) from 40-60% of a first polyamide melting within the approximate range of 130-210° C. and being derived from a mixture of from 85-98% polymeric fat acids and from 2-15% of non-fatty polycarboxylic acid in which the carboxyl groups are separated by from 3 to 8 carbon atoms, and an aliphatic diamine and (b) from 40-60% of a second polyamide melting below 100° C. and being derived from polymeric fat acids and an aliphatic polyamine, the amino groups primarily involved in the polyamide formation being separated by at least 3 atoms; the mixture of polyamides having an amine number of at least 5 and being dispersed in an aqueous medium by means of sufficient acid to produce a stable suspensoid.

3. A suspensoid in an aqueous medium of (a) from 20-90% of a first polyamide melting within the approximate range of 130-210° C. and being derived from a mixture of from 85-98% polymeric fat acids and from 2-15% of sebacic acid, and an aliphatic diamine and (b) from 10-80% of a second polyamide melting below 100° C. and being derived from polymeric fat acids and an aliphatic polyamine, the amino groups primarily involved in the polyamide formation being separated by at least 3 atoms; the mixture of polyamides having an amine number of at least 5 and being dispersed in an aqueous medium by means of sufficient acid to produce a stable suspensoid.

4. A suspensoid in an aqueous medium of (a) from 20-90% of a first polyamide melting within the approximate range of 130-210° C. and being derived from a mixture of from 85-98% polymeric fat acids and from 2-15% of adipic acid, and an aliphatic diamine and (b) from 10-80% of a second polyamide melting below 100° C. and being derived from polymeric fat acids and an aliphatic polyamine, the amino groups primarily involved in the polyamide formation being separated by at least 3 atoms; the mixture of polyamides having an amine number of at least 5 and being dispersed in an aqueous medium by means of sufficient acid to produce a stable suspensoid.

5. A suspensoid in an aqueous medium of (a) from 20-80% of a first polyamide resin melting within the approximate range of 130-210° C. and being derived from 85-98% of polymerized fat acids and from 2-15% of sebacic acid and ethylene diamine, and (b) from 10-90% of a second polyamide resin melting below 100° C. and being derived from polymeric fat acids and diethylene triamine; the mixture of polyamide resins having an amine number of at least 10 and being dispersed in an aqueous medium by means of sufficient acid to produce a stable suspensoid.

6. A suspensoid in an aqueous medium of (a) from 20–80% of a first polyamide resin melting within the approximate range of 130–210° C. and being derived from 85–98% of polymerized fat acids and from 2–15% of adipic acid and ethylene diamine, and (b) from 10–90% of a second polyamide resin melting below 100° C. and being derived from polymeric fat acids and diethylene triamine; the mixture of polyamide resins having an amine number of at least 10 and being dispersed in an aqueous medium by means of sufficient acid to produce a stable suspensoid.

7. A suspensoid in an aqueous medium of (a) from 40–60% of a first polyamide resin melting within the approximate range of 130–210° C. and being derived from 85–98% of polymerized fat acids and from 2–15% of sebacic acid and ethylene diamine, and (b) from 40–60% of a second polyamide resin melting below 100° C. and being derived from polymeric fat acids and diethylene triamine; the mixture of polyamide resins having an amine number of at least 10 and being dispersed in an aqueous medium by means of sufficient acid to produce a stable suspensoid.

8. A suspensoid in an aqueous medium of (a) from 40–60% of a first polyamide resin melting within the approximate range of 130–210° C. and being derived from 85–98% of polymerized fat acids and from 2–15% of adipic acid and ethylene diamine, and (b) from 40–60% of a second polyamide resin melting below 100° C. and being derived from polymeric fat acids and diethylene triamine; the mixture of polyamide resins having an amine number of at least 10 and being dispersed in an aqueous medium by means of sufficient acid to produce a stable suspensoid.

No references cited.